United States Patent [19]

Connett

[11] 3,930,921

[45] Jan. 6, 1976

[54] METHOD OF FINISHING LEATHER

[75] Inventor: Hugh H. Connett, Wayne, Pa.

[73] Assignee: Barrett & Company, Newark, N.J.

[22] Filed: Aug. 13, 1973

[21] Appl. No.: 387,942

Related U.S. Application Data

[63] Continuation-in-part of Ser. Nos. 163,611, July 19, 1971, abandoned, and Ser. No. 237,696, March 24, 1972, Pat. No. 3,809,597.

[52] U.S. Cl. .......................... 156/234; 8/2.5; 8/12; 8/13; 156/238; 156/239; 156/241; 427/148; 427/152; 428/101; 428/473; 428/508; 428/510; 428/532; 428/914

[51] Int. Cl.$^2$ ..................... B32B 31/20; B32B 27/08; B32B 31/12; D06P 3/32

[58] Field of Search .......... 156/238, 239, 240, 241, 156/57, 234; 8/2.5, 12, 13; 161/39, 40, 226, 406, 102, 208, 209; 427/148, 152; 428/101, 473, 508, 510, 532, 914

[56] References Cited

UNITED STATES PATENTS

| | | | |
|---|---|---|---|
| 1,843,739 | 2/1932 | Schubert | 8/2.5 |
| 2,029,377 | 2/1936 | Kaplan | 161/226 X |
| 2,126,321 | 8/1938 | Freudenberg et al. | 161/226 X |
| 2,606,853 | 8/1952 | Reese et al. | 161/209 X |
| 2,795,564 | 6/1957 | Conn et al. | 260/80.8 X |
| 3,276,933 | 10/1966 | Brant | 161/406 X |
| 3,328,190 | 6/1967 | Mathieu | 156/240 X |
| 3,458,376 | 7/1969 | Malik | 156/241 X |
| 3,473,990 | 10/1969 | Simon et al. | 161/226 X |
| 3,713,938 | 1/1973 | Sutton | 161/226 X |
| 3,794,544 | 2/1974 | Eckert et al. | 156/239 X |

FOREIGN PATENTS OR APPLICATIONS

| | | | |
|---|---|---|---|
| 1,268,763 | 3/1972 | United Kingdom | 156/239 |

*Primary Examiner*—William A. Powell
*Assistant Examiner*—Thomas Bokan
*Attorney, Agent, or Firm*—Hubbell, Cohen, & Stiefel

[57] ABSTRACT

An improved method of finishing leather by transferring a finish coating, at least the outer stratum of which comprises a thermoplastic, adhesive acrylic polymer, from a release layer bearing the finish coating to the leather. The leather to be coated (which may be supported on an appropriate backing layer) and the release layer are pressed into a sandwich-like assembly with the concurrent application of sufficient heat and pressure to transfer substantially the entire finish coating to the surfaces of the leather and the backing layer juxtaposed therewith. Transfer of the finish coating is effected without the application of any adhesive material or "tie coat" prior to pressing the coating into contact with the leather, by virtue of the thermoplastic, adhesive characteristics of the acrylic finish coating per se.

The method may be carried out batch-wise employing discrete backing and release layers for the transfer of finish coatings to individual leather pieces. Alternatively, the method may be performed continuously with the successive feed of leathers to be coated between a transfer web providing the desired release layer and a supporting web imparting the requisite backing or support.

9 Claims, 3 Drawing Figures

METHOD OF FINISHING LEATHER

CROSS REFERENCE TO RELATED APPLICATIONS

Figure 1:
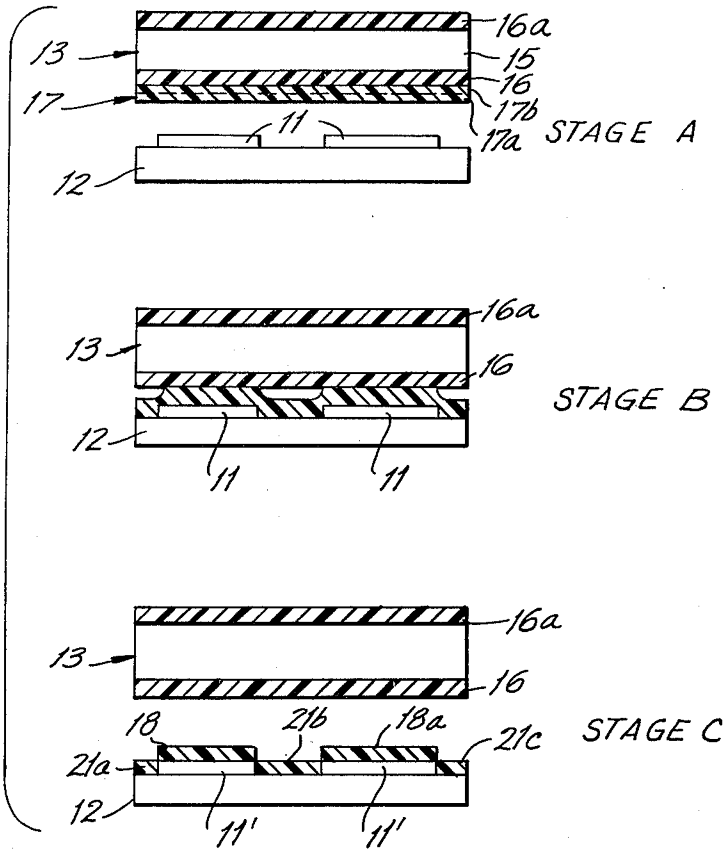

This application is a continuation-in-part of copending application Ser. No. 163,611 filed on July 19, 1971, now abandoned; and application Ser. No. 237,696 filed Mar. 24, 1972 now U.S. Pat No. 3,809,597.

BACKGROUND OF THE INVENTION

Finishes are conventionally applied to leathers to impart protective coatings thereto, to level the color, and to minimize natural defects in the leather skins or hides. At the present time such finishes are generally applied by swabbing (brushing) and/or spraying the finish coatings upon the leathers; in some limited cases, as in the application of polyurethane coatings for patent leathers or for other effects, the finish coatings may be applied by flow-coating operations. In all such instances, sufficient finish is applied to the leather substrate to provide a continuous film upon the leather epidermis.

Typically, between two and six passes are required on conventional leather finishing equipment to deposit the desired continuous film on the leather substrates. Moreover, the leather may be plated between passes to facilitate the film-forming process and smooth out the sand-like surface formed by spray application of the finish. Each pass of the leathers to be finished through conventional finishing equipment subjects the same to pre-wetting and subsequent forced heat drying. Such operations tend to subject the collagen fibers to successive swelling and contraction, and impair the ultimate hand of the leather product.

Skins or hides employed in the manufacture of leathers differ from one another, not only in regard to the number, type and location of natural blemishes (scratches, scars, coarse grain, etc.) but also with respect to the character and quality of the skins or hides themselves. Different sections of any given animal skin exhibit varying absorption of leather finishes, and hence take on differing shades. Moreover, leather made from a well nourished, healthy animal has different absorptive characteristics than that made from an animal which is not as healthy or which may have been undernourished. Finish coatings are unevenly absorbed by such substrates. Thus, open cuts or bites on the leather epidermis absorb more finish and therefore darken relative to unblemished areas. Similarly, a well-nourished skin exhibits finish receptivity distinct from one not as well nourished. The application of finishes of uniform shades to varying leathers (or even to a single skin) is, therefore, exceedingly difficult to achieve employing conventional leather finishing operations.

Various procedures have also been proposed for laminating finish coatings to leather surfaces, particularly split leathers. Coatings thus applied have included various lacquers and, in more recent years, polyurethane finishes. See Poschel U.S. Pat. No. 1,955,562 granted Apr. 17, 1934; and Sutton U.S. Pat. No. 3,713,938 granted Jan. 20, 1973, British Pat. No. 1,268,763, and Das Leder 22, No. 5 (May 1971), pages 97–100, No. 7 (July 1971), pages 147–150 and No. 12 (December 1971), pages 269–276). Use of these prior techniques entails the application of some form of adhesive material prior to transferring the finish coating to the leather, a procedure which necessitates both the use of special equipment (coaters and drying ovens, for example) and imposes processing problems per se.

When, for example, an adhesive is sprayed or otherwise applied to the leather prior to transferring the finish thereto (see, for example, the cited "Das Leder" papers), it is important to control the particle size of the adhesive to thereby regulate its degree of penetration into the leather. Too great a penetration is said to result in poor adhesion of the finish, whereas insufficient penetration causes bubbling and wrinkling of the finish coating and distortion thereof. Moreover, leathers precoated with adhesive prior to application of the finish layers may block; to decrease the tack of the adhesives and thus overcome this problem the addition of non-thermoplastic binders thereto has been proposed. The addition of such material however, adversely affects the bond between the transfer finish and the leather substrate.

It is among the objects of the present invention to provide an improved method for finishing leather which may be efficiently and economically carried out, which requires only a single pass, and which provides more uniformly finished leathers than achieved in accordance with conventional leather finishing operations. A further object of the invention is to provide such a method employing finish coatings which may be transferred in the dry state without pre-treatment with any adhesives, tie-coats or the like, and which may thus be readily and simply practiced by tanners, shoe manufacturers or others without requiring the use of complex equipment or techniques such as employed in prior wet process transfer operations. These and other objects and advantages of the invention will be apparent from the following detailed description of preferred embodiments thereof, taken in connection with the accompanying drawing in which:

THE DRAWING

Figure 2:
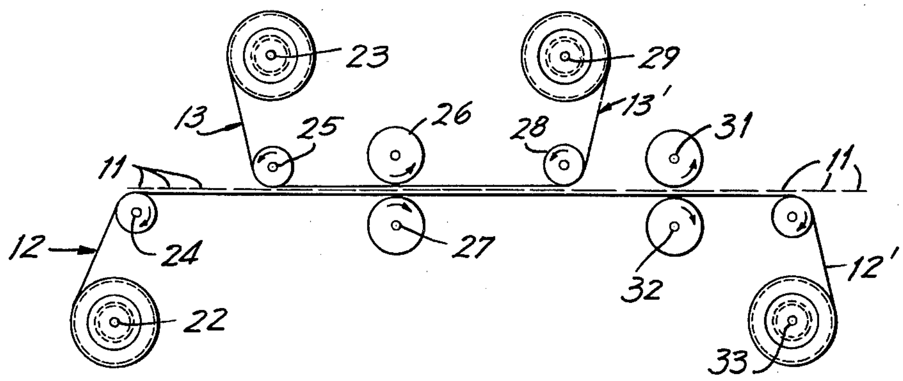
Figure 3:
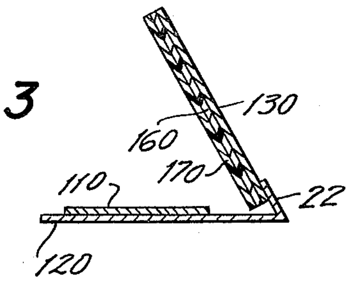

FIG. 1 is a diagrammatic cross-sectional view, with the dimensions of the various materials exaggerated for purposes of illustration, showing the successive stages of the leather finishing method of the present invention;

FIG. 2 is a schematic cross-section of an apparatus for carrying out the leather finishing method in a continuous manner; and FIG. 3 is a diagrammatic cross-sectional view, with the dimensions of the various strata again exaggerated for purposes of illustration, showing a differing configuration of the backing and release layers which may be used when it is desired to perform the leather finishing method batch-wise in accordance with one preferred embodiment of the invention.

It has been discovered in accordance herewith that improved finishing of leather is achieved by a technique involving the transfer of a finish coating, at least the outer stratum of which comprises a thermoplastic, adhesive acrylic polymer coating, from a release layer bearing the same directly to the leather surfaces to be finished. Such a pre-formed finished may be directly applied to leathers without prior treatment with adhesives or the use of "tie-coats" or other concurrently employed wet processing.

Preferably, the finish coating thus transferred incorporates at least two distinct strata, the first of which provides the base coat of the finish on the leather and is made up of the indicated thermoplastic, adhesive acrylic polymer coating, and the second of which forms the top coat of the leather finish and comprises a hard, non-tacky nitrocellulose lacquer. Finishes thus provided bond readily and permanently to the leather (by means of the tacky, adhesive acrylic base coat) while simultaneously defining a hard, non-tacky finish thereon (by virtue of the non-tacky nitrocellulose lacquer). By thus constituting the finish coating, and providing the base coat in substantially greater thickness than the top coat (suitably, two or more times the thickness of the latter), sufficient flexibility is imparted to the finished leather to prevent cracking or rupturing thereof in the case of firm as well as stretchy leathers such as glove leather. This characteristic stands in marked contrast to conventional nitrocellulose lacquer leather finishes, which are relatively inflexible and are quite susceptible to cracking.

Finish coatings produced in accordance with the method hereof may readily provide a number of desired esthetic effects. Thus, aniline-type effects may be produced, without the necessity of dyeing the leather itself, merely by incorporating suitable dyes and pigments in the base and top coats of the finish coating, respectively. Alternatively, the finish coating may be applied directly to previously finished leathers in predetermined areas thereof to provide two-tone or other designs as desired. This last-mentioned feature is particularly advantageous inasmuch as it has, heretofore, been necessary to stitch two or more pre-finished leathers together to achieve such effects, In addition, employing the method of the present invention leather finishes of any type may be employed with far greater uniformity than when previously known leather finishing techniques are so utilized. Finish coatings may be applied to leathers by the present method employing only a single step, such coatings defining continuous films which are ironed during a single finishing operation and which require no further after-treatment. Also, the continuous finish film or coating produced in accordance with the present method does not darken open scars or other blemishes in the leather surfaces, but tends to level the color of differing portions of the leathers, e.g., scratches, scars or the like, more uniformly than conventional leather finishing processes.

Furthermore, cross-linked polyacrylate resin coatings applied to the leather surfaces in accordance herewith impart greater durability, washability and solvent resistance to the finished leather. On the other hand, such resin coatings cannot be cross-linked employing conventional leather finishing processes since the duration and temperature of the heat treatment required to achieve polymerization with such techniques would destroy the leather fibers.

The method of the invention may be carried out either batch-wise or in a continuous manner to provide direct finishing of usable leathers in any quantity. Employing such method it is unnecessary to maintain large inventories of leathers having differing colors or other finishes. Rather, any desired finish may be directly and immediately applied to the leathers in response to specific orders for products so finished. Thus, in accordance with the present invention solely inventories of the relatively inexpensive release materials bearing the releasable leather finish coatings thereon need be maintained.

Yet a further, concomitant advantage inherent in the method of the present invention is that such may be employed without the application or loss of large quantities of volatile solvents such as are frequently used in the spray application of leather finishes. Apart from economies in the use of processing materials thus achieved, use of this method thus decreases the risk of atmospheric pollution and avoids the necessity for solvent recovery or similar operations.

When it is desired to carry out the improved leather finishing method hereof in large-scale, continuous manner the leather finish coatings may be applied to each successive leather substrate by introducing the same onto a continuous bakcing or supporting web, feeding the web with the leather substrate thereon into contact with a continuous release or transfer web having the releasable finish coating thereon, and transferring the finish coating from the transfer web to the surfaces of the leather substrate and the supporting web juxtaposed therewith, substantially all of the coating being thereby offset from the transfer web to the leather surfaces. The transfer web is thereafter separated from the supporting web and the finish-coated leather substrate, and the latter removed from the supporting web.

When, on the other hand, it is desired to finish an individual leather piece or pieces with any predetermined finish coating, the method may readily be carried out batch-wise. In such instance, backing and release layers may be provided in the form of discrete sheet materials having substantially the same dimensions and secured to one another along at least one abutting edge of each such article. The layers thus provide a pre-formed finishing assembly which, upon insertion of one or more leather substrates as a "filling" therebetween, may be pressed together sandwich-like to transfer the finish coating from the release layer to the juxtaposed surfaces of the leather substrate and the backing layer. Inventories of such individual finishing assemblies may thus be maintained by tanners, shoe manufacturers, or other users, and employed for finishing operations on demand.

Alternatively, the finish coatings employed in the practice of the present invention may be applied to release layers having the precise configuration of the leather substrate to be coated, e.g., in any of the die-cut shapes referred to hereinafter, and transferred directly to the desired leather, without the use of any backing or supporting layer or web. In such instance, the transfer layer and the leather are merely superimposed and subjected to appropriate heat and pressure, as between appropriate pressure rolls. The back-up pressure roll thus utilized may be provided with a facing of an appropriate release material, e.g., with a silicone rubber coating, in order that any excess finish coating not permanently adhere thereto.

The present method may be employed in the finishing of leather substrates of any suitable type. Thus, finish coatings may be applied by the method of the invention to leather skins; hides; die-cut leather pieces in various shapes, e.g., shoe uppers, quarters, tips, vamps, straps, or lining quarters and vamps; all leather goods, e.g., wallets, key cases, eyeglass cases, billfolds, handbags or belts; garments; cut upholstery patterns; or the like. It should be understood, therefore, that as used herein the terms "leather substrates" or "leather pieces" include all such leather materials.

PREFERRED EMBODIMENTS OF THE INVENTION

The preferred thermoplastic, adhesive acrylic polymer coatings utilized for at least the base coat of the finish hereof suitably comprise poly(acrylates) of the type described in Conn et al U.S. Pat. No. 2,795,564 granted June 11, 1957. The resinous constituent thereof comprises an interpolymer made up of (A) units having carboxylate groups from at least one polymerizable alpha, beta-unsaturated vinylidene carboxylic acid, (B) units from at least one polymerizable ester which by itself forms soft polymers and which is selected from the group consisting of esters of acrylic acid and primary or secondary alkanols having from 1 to 18 carbon atoms, esters of methacrylic acid and primary or secondary alkanols having from 5 to 18 carbon atoms, and (C) units from at least one polymerizable monovinylidene compound which by itself forms a hard polymer and which is selected from the group consisting of alkyl methacrylates in which the alkyl group has 1 to 4 carbon atoms, tert-amyl methacrylate, tert-butyl acrylate, tert-amyl acrylate, cyclohexyl acrylate, and cyclohexyl methacrylate, as more fully disclosed in the aforesaid patent the disclosure of which is incorporated by reference herein. The carboxylate units suitably constitute between about 0.5 and 2.5% by weight of the interpolymer, while the ratio of units (B) from the ester of units (C) from the compound is between about 9:1 and 1:20 parts by weight.

The base coat stratum incorporating an interpolymer of the noted type remains tacky and adhesive after drying and may thus be directly utilized, as indicated hereinabove, to permanently bond the finish to the desired leather. So long as this inherent adhesive characteristic is not materially affected, the base coat may also incorporate spirit-soluble dyes, pigments, waxes or other additives for improving the desired appearance or other characteristics of the finished leather. Materials so useful when applied by the method of the present invention include spirit soluble dyes such as Rohm and Haas' LS series, K. J. Quinn & Co.'s RD series, Chemical Coating Corporation's Hycon series, and du Pont's Luxal series; and pigments such as Rohm and Haas' Primal Colors and Sandoz' Relcasyn azo pigments.

As previously noted, the finish coating preferably additionally incorporates a second stratum for forming the top coat of the leather finish, this coat comprising a hard, non-tacky nitrocellulose lacquer. Such coat may suitably be formed from nitrocellulose dispersions or emulsions, such as Rohm and Haas' Hydrolac WC-230 (or WC-300), Ortho-Clear 260 (or 261-D) or Chemical Coating Corporation's Trans E series of coatings. The top coat may additionally contain suitable additives, e.g., resins, plasticizers, pigments or the like, for modifying the characteristics of the lacquer film.

The successive stages of one preferred embodiment of the present invention are illustrated in FIG. 1 of the drawing.

As shown in Stage A thereof, leather substrates 11 to be finished are placed between a backing or supporting layer 12 and a release or transfer layer 13. The backing layer 12 may comprise an untreated kraft paper. The release layer 13, on the other hand, is generally the composite of a carrier 15 desirably constituted of a paper or similar sheet material, and a permanent release stratum 16 having a transferable finish coating 17 thereon. When the release layer is provided in web form, as described in connection with FIG. 2 below, an additional permanent release stratum 16a may be provided on the side of the layer remote from stratum 16. In this manner the transfer web may be rolled up without blocking, notwithstanding the highly tacky, adhesive characteristics of the outer stratum of the finish coating.

The permanent release stratum 16 (and stratum 16a, if employed) comprises a coating of a material upon which the finishing composition may be releasably coated and which will not itself be offset from the release layer upon transfer of the finishing composition to the leather substrates 11 and the backing layer 12 therefor. Polymethylsiloxane coatings may, for example, be so utilized. Alternatively, other siloxanes or other known release coatings may be similarly useful. Release layers found particularly satisfactory include those commercially available from S. D. Warren Company under the designations "Transcote Patent A", "Stripkote Vel C 2S Gloveskin" and "Transcote ER-VRL", the latter two bearing release strata 16 and *16a* on opposite sides thereof).

The releasable finish coating 17 may comprise any of the above noted leather finishing compositions. Preferably, the finish coating incorporates a first or outer stratum *17a* constituted of the aforesaid thermoplastic adhesive acrylic polymer coating for forming the base finish coat on the leather, and a second or inner stratum constituted of the hard, non-tacky nitrocellulose lacquer for forming the top coat of the finish. While the respective strata *17a* and *17b* are, for purposes of simplification of the drawing, shown only in Stage A of FIG. 1, it will be understood that both such strata transfer to the leather in the subsequent stages illustrated. Thus, the entire finish coating 17 adheres to the release layer 13 and is not offset therefrom when, for example, the layer is a continuous web and is rolled on itself. When, however, the layer is superimposed with the leather substrates 11 and the backing layer 12 and sufficient heat and pressure are applied thereto, the finish coating is substantially entirely transferred or offset from layer 13 thereto.

Superimposition of the respective layers in a sandwich-like assembly is illustrated in Stage B of FIG. 1. The transferable finish coating 17 on the release layer is thus pressed against both the outer surfaces of the leather substrates 11 and the adjacent, juxtaposed surface of the backing layer 12. The superimposed layers are simultaneously squeezed together and heated to effect transfer of the finish coating. Preferably, the respective layers are heated to temperatures of from about 150° to 200° C under pressure to effect the desired transfer.

As shown in Stage C of FIG. 1, the thus processed layers 12 and 13 are thereafter separated. The finish coating is thus transferred to the leather substrates 11, forming coatings 18 and *18a* thereon and being offset onto the juxtaposed surfaces *21a,* *21b* and *21c* of the backing layer 12. Substantially all of the finish coating 17 is thus transferred from layer 13 to the juxtaposed surfaces of the leather substrates and the backing layer.

A preferred form of apparatus for carrying out the present method by a continuous operation is schematically illustrated in FIG. 2 of the drawing. As shown therein, the backing or supporting layer 12 is fed as a continuous web from a feed roll 22 into contact with the release or transfer web 13 fed from a feed roll 23. The respective continuous webs may be fed over suitable idler rolls, such as rolls 24 and 25. The leather substrates 11 to be finished are intermittently fed onto the continuous web 12, thus forming the assembly illustrated in Stage A of FIG. 1.

The superimposed layers are thereafter fed into the nip of rolls 26 and 27, the former of which is a heated steel roll and the latter of which is an adjustable pressure roll. These rolls squeeze the several layers into the sandwich-like assembly illustrated in Stage B of FIG. 1, subjecting the same to sufficient heat and pressure to offset the finish coating from the transfer web to the leather substrates and the supporting web therefor. In the preferred embodiment shown, the heated roll 26 contacts only the transfer web 13. In this manner, undue heating and consequent damage of either the leather substrates 11 or the paper supporting web 12 is avoided.

The web assemblage is thereafter passed over a support roll 28, which may be used to adjust the tension on the transfer web, and the latter is stripped from the assembly and wound on a rewind roll 29. The assembly removed from the support roll corresponds to that shown in Stage C of FIG. 1 of the drawing. The stripped transfer web or release paper, designated 13' in FIG. 2, may thereafter be removed from roll 29, re-coated with additional finish, and mounted on feed roll 23 for further finishing operations.

After thus coating the finish upon the leather substrates the supporting web carrying the same is passed through the nip of a further heated roll 31 and adjustable pressure roll 32. The finish layer upon each leather substrate is thereby ironed to impart the required gloss and hand to the leather. The thus coated and cured finished leathers, designated as 11', are removed from the supporting web, and the latter, illustrated at 12', is wound up on a take-up roll 33.

Employing the continuous system described hereinabove the finished leathers may readily be stripped from the supporting web without leaving any residual or frayed edges or 'flashing' from the finish coating adhering to the edges of the coated leather surfaces. To the contrary, it has been found that the finish layer breaks evenly along the edges of the leather, providing a uniform coating which does not require any trimming and leaving the balance of the finish on the kraft paper supporting web. After winding up the latter, the web may be discarded or suitably treated for recovery of the excess finish coating.

When, on the other hand, it is desired to individually finish leather substrates in a batch-wise manner, a finishing assembly such as illustrated in FIG. 3 is preferably employed. Such assembly incorporates an individual discrete backing layer 120 and release layer 130, which have areas of the same order of magnitude as the leather substrate 110 to be finished therewith and possess substantially the same dimensions. The sheets 120 and 130 are secured to one another along an abutting edge of each layer by any suitable means, as by folding over or hinging the margin 22 of the backing layer 120 and cementing, stapling or otherwise securing the same to the corresponding margin of layer 130. In this manner, the discrete sheet materials may readily and economically be utilized to provide a finishing assembly into which the leather substrates 110 may be inserted and with which they may be finished.

The respective sheet material layers 120 and 130 may have the same structure and composition as backing and release layers 12 and 13, respectively. Thus, the release layer 130 may comprise a permanent release stratum 160 and a releasable finish coating 170 corresponding in composition, respectively, to strata 16 and 17 of the transfer layer 13 shown in FIG. 1.

The finishing assembly of FIG. 3 is employed in the same manner as illustrated in the successive stages of FIG. 1. The plural layers of the assembly are pressed together and, desirably, heated between a pair of rolls such as rolls 26 and 27 of the embodiment illustrated in FIG. 2. It will, however, be understood that the assembly of FIG. 3 may be used in connection with any device having a pair of nip rolls or the like and need not have any associated winding or unwinding equipment such as is involved in the apparatus shown in FIG. 2.

Use of the batch-wise finishing assembly of FIG. 3 is particularly advantageous when it is desired to finish relatively small, pre-cut leather pieces such as shoe uppers. Moreover, leather finishing may be carried out employing this embodiment of the invention employing relatively simple and inexpensive equipment and with relatively increased ease of handling. Finally, use of previously prepared finishing assemblies incorporating any desired finish coatings provides improved flexibility and control of leather finishing operations.

The following examples relate to specific embodiments of the method of this invention carried out continuously in connection with an apparatus of the type illustrated in FIG. 2 (Examples 1–8, 10 and 11), or batch-wise employing the finishing assembly shown in FIG. 3 (Examples 9–11). In the examples all parts and percentages are given by volume and all temperatures in °C, unless otherwise indicated.

EXAMPLE 1

A finish coating is applied to one side of a transfer or release web pre-coated on both sides thereof with polysiloxane release coatings (S. D. Warren's Transcote ER-VRL). The finish coating is formed with distinct strata for forming the top coat and the base coat of the ultimate leather finish, respectively. The first stratum, for forming the topcoat, is produced by deposition of a layer from the following dispersion:

| | | |
|---|---|---|
| Nitrocellulose emulsion of a plasticized polyacrylate incorporating a spirit-soluble dye, a sulfonated castor oil, and a high boiling solvent, and having a solids content of about 4.9% by weight (Chemical Coatings Co. "Trans E 1688") | — | 400 parts |
| Clear nitrocellulose emulsion of a plasticized polyacrylate incorporating a sulfonated castor oil and a high boiling solvent (Chemical Coatings Co. "Clear Slip 1230") | — | 50 parts |
| Aqueous nitrocellulose emulsion of a relatively soft, high molecular weight amide-containing copolymer of lower alkyl methacrylates, the emulsion having a 35% by weight solids content, a pH of 2.6–3.0 and a density of 8.5 (Rohm and Haas' "Primal HA-65") | — | 10 parts |
| Water | — | 10 parts |

The first stratum is applied to the transfer web and the web is thereafter dried, e.g., by forced air drying at 160° C for 3 minutes, after which it is cooled to provide the "top coat" layer approximately 0.003 inch thick on one face of the web.

The second stratum for forming the adhesive, base coat of the finish is deposited from a dispersion of the following:

| | | |
|---|---|---|
| Self-cross linking acrylic emulsion (Rohm and Haas' "Primal HA-4") | — | 16 parts |
| Aqueous emulsion of an intermediate hardness, high molecular weight, acrylic polymer having adhesive characteristics, of the type disclosed in U.S. Pat. No. 2,795,564, the emulsion having a solids content of 46% by weight, a pH of 9.7 and a density of 8.0 lbs./gal. (Rohm and Haas' "Primal AC-34") | — | 8 parts |
| Aqueous emulsion of relatively soft acrylic polymer having adhesive characteristics, of the type disclosed in U.S. Pat. No. 2,795,564, thickened with ammonium hydroxide and having a solids content of 46% by weight and a density of 8.8 lbs./gal., and a viscosity of 100,000 cps (Rohm and Haas' "Primal B-15") | — | 4 parts |
| Aqueous dispersion of silica dulling agent (Rohm and Haas' "Primal Dull 140") | — | 3 parts |
| Aqueous emulsion of a hard methyl acrylate polymer, the emulsion having a solids content of 38% by weight, a pH of 9.6–10 and a specific gravity of 1.07 (Rohm and Haas' "Primal B-85") | — | 4 parts |
| Water | — | 2 parts |

The second stratum is dried by forced air drying as aforesaid to form the "base coat" layer having an approximate 0.007 inch thickness. The layer remains tacky after drying.

The thus coated transfer web 13 is passed through the apparatus illustrated in FIG. 2, into superimposition with a supporting web 12 constituted of a brown kraft paper web (50 weight) on which a number of leather pieces to be finished are placed, grain side up. The webs are initially passed between pressure rolls 26 and 27 as shown in FIG. 2, the composite assembly being heated at a temperature of 150° C for about 2 seconds. The finish coating is thus stripped from the transfer web and deposited on the juxtaposed surfaces of the leather substrates and the intermediate portions of the backing web 12. The remaining transfer paper web 13' is then rewound on roll 29 for re-coating.

Supporting web 12' bearing the coated leather substrates 11' is then passed between the pressure rolls 31 and 32, wherein it is heated to 150°–200° C for about 2 seconds. The finish coating is thus smoothed and ironed and a desired final gloss imparted to the coated leather. The leather substrates are thereafter stripped from the supporting web and the finished leathers removed without formation of any residual frayed coated edges.

EXAMPLE 2

Example 1 is repeated utilizng the following composition for forming the top coat for the desired finish coating:

-continued

| | | |
|---|---|---|
| Aqueous nitrocellulose emulsion of an acrylic polymer having a solids content of 13% by weight, a pH of 6.0–7.0, and a density of 7.64 lbs./gal. (Rohm and Haas' "Hydrholac WC-230") | — | 40 parts |
| A spirit soluble dark brown dye having a density of 7.15 lbs./gal. and being compatible with both water and organic solvents (Rohm and Haas' "LS-3004") | — | 40 parts |
| An aqueous emulsion of an intermediate hardness, high molecular weight acrylic polymer, of the type disclosed in U.S. Pat. No. 2,865,877, the emulsion having a solids content of 20% by weight and a density of 8.6 lbs./gal. (Rohm and Haas' "Primal B-88") | — | 10 parts |
| An aqueous emulsion of a soft, fine particle size, high molecular weight acid-containing lower alkyl acrylate polymer, the emulsion having a solids content of 46% by weight, a pH of 6.1–6.7, and a density of 8.84 lbs./gal. (Rohm and Haas' "Primal LT-87") | — | 10 parts |
| Sulfonated castor oil (Atlas' 152 oil) | — | 5 parts |
| Water | — | 5 parts |

The overall coating composition has a solids content of approximately 10% by weight.

Upon forming the dual stratum coating and transferring it to leather substrates in the manner described in Example 1, similar finishes are formed thereon.

EXAMPLES 3–6

Leather finishes are applied in accordance with the procedure described in Example 1, by the transfer of finish layers incorporating the base coat stratum prepared as described above and top coats prepared by deposition of the following compositions:

| Example 3 | | |
|---|---|---|
| "Hydrholac WC-230" | — | 40 parts |
| "Primal HA-65" | — | 10 parts |
| "Primal LT-87" | — | 10 parts |
| Iron oxide pigment (Rohm and Haas' "Primal Brown") | — | 30 parts |
| Example 4 | | |
| "Trans E 1688" | — | 30 parts |
| An aqueous emulsion of a high molecular weight, self-cross-linking acrylic polymer of the type disclosed in U.S. Pat. No. 3,157,562, the emulsion having a solids content of 46% by weight, a pH of 2.8–3.6 and a density of 8.8 lbs./gal. (Rohm and Haas' "Primal E-32") | — | 10 parts |
| An organic phosphate-surfactant solution for promoting uniformity of coating and penetration of the finish into leather substrates, having a solids content of 20% by weight and a density of 8.3 lbs./gal. (Rohm and Haas' "Primal Leveler MA-65") | — | 5 parts |
| Water | — | 10 parts |
| Example 5 | | |
| "Primal Brown" | — | 40 parts |
| "Primal E-32" | — | 20 parts |
| "Primal B-88" | — | 10 parts |
| " Hydrholac WC-230" | — | 30 parts |
| Water | — | 10 parts |
| Example 6 | | |
| $TiO_2$ in the rutile form (Rohm and Haas' "Primal White 1687") | — | 40 parts |
| "Primal B-15" | — | 30 parts |
| "Primal B-88" | — | 5 parts |

-continued

| Example 3 | | |
|---|---|---|
| Water | — | 5 parts |

EXAMPLE 7

When completely cross-linked acrylic polymer finish coatings are desired, the coating 17 formed on layer 13 and thereafter transferred in accordance with the present invention may be formed by the application of a three stratum coating. Compositions which may be utilized in forming the initial stratum of such a coating (for forming the top coat of the leather finish) include the following:

| A. | | |
|---|---|---|
| "Hydrholac WC-230" | — | 40 parts |
| "LS-3004" | — | 20 parts |
| "Primal B-88" | — | 10 parts |
| B. | | |
| "Trans E 1688" | — | 40 parts |
| "Primal HA-65" | — | 5 parts |
| Water | — | 10 parts |
| C. | | |
| Nitrocellulose topcoat solution (Rohm and Haas' "Ortho-Clear 260") | — | 20 parts |
| Di-isobutyl Ketone | — | 20 parts |
| $TiO_2$ pigment (Rohm and Haas' "Orthochrome White No.3") | — | 4 parts |
| Oil-modified alkyd plasticizer solution (Rohm and Haas' LS-3013") | — | 2 parts |

After application of the initial stratum such is dried, e.g., at 100° C for 2 minutes, and a second stratum deposited thereon formed, for example, from either of the following compositions:

| A. | |
|---|---|
| "Primal White 1687" | — 40 parts |
| "Primal B-15" | — 30 parts |
| "Primal B-88" | — 5 parts |
| Water | — 5 parts |
| B. | |
| "Primal E-32" | — 25 parts |
| "Primal AC-34" | — 25 parts |
| "LS-3004" | — 5 parts |
| Water | — 20 parts |

The second stratum is then dried, e.g., at 170° C for 3 minutes, to cross-link the acrylic resin, the final stratum for forming the adhesive base coat of the finish is deposited in the manner described in Example 1, and the transfer coating 17 is thereafter transferred to the leather substrates.

EXAMPLE 8

Further leather finishes are applied in accordance with Example 1 by the transfer of a finish coating incorporating a polyurethane-containing top coat formed by application of the following formulation to layer 13:

-continued

| | |
|---|---|
| Nitrocellulose-polyurethane elastomeric lacquer incorporating methyl ethyl ketone as a solvent and having a density of 8.07 lbs./gal., a viscosity of 30 G-H sec. and containing 40% by weight non-volatiles (Polyurethane lacquer "XP-2085" distributed by Spencer Kellogg Division of Textron Inc.) | — 2 parts |
| Toluene | — 2 parts |
| Methyl ethyl ketone | — 4 parts |

After drying at 160° C for 3 minutes, the top coat is cured, after which the base coat is formed and the composite layer transferred as described hereinabove.

EXAMPLE 9

A finishing assembly of the type illustrated in FIG. 3 is prepared as follows:

Initially, a release layer is provided by the successive coating of a release paper having a finish-receptive polysiloxane outer surface (S. D. Warren's Transcote ER) with the following finish mixes:

| A. (For Formation of Finish Top Coat) | | |
|---|---|---|
| Aqueous nitrocellulose emulsion of an acrylic polymer (Rohm and Haas' "Hydrholac WC-300") | — | 12 parts |
| A self-cross linking acrylic emulsion (Rohm and Haas' "E-760") | — | 3 parts |
| Aqueous wax dispersion (Rohm and Haas' "Primal Binder C-6") | — | ½ parts |
| Azo pigment (Sandoz' "Relcasyn Brown GLA-817-6") | — | 1 parts |
| Curing catalyst for self-cross linking acrylic emulsion (Rohm and Haas' "Catalyst LA-2027") | — | 0.3 parts |
| B. (For Formation of Finish Base Coat) | | |
| Self-cross linking acrylic emulsion (Rohm and Haas' "Primal HA-4") | — | 16 parts |
| "Primal B-15" | — | 4 parts |
| "Primal AC-34" | — | 8 parts |
| Aqueous dispersion of silica dulling agent (Rohm and Haas' "Primal Dull 140") | — | 3 parts |
| "Primal B-85" | — | 4 parts |
| Water | — | 2 parts |

To the finish base coat may be added certain colorants such as Sandoz' azo pigment "Relcasyn Brown GLA-817-6".

The preceding coatings are successively applied and dried to form a film of from about 0.5 to 0.75 mil on the release layer. A coated roll of such material is then slit into any desired width, e.g., from 10 inches to 4 feet, for forming the finishing assemblies. A kraft paper backing layer is prepared from an appropriate roll source, the web being slit approximately 1 inch wider than the coated release paper and the 1 inch overlap being folded over the margin of the coated release paper and glued along the abutting edge as at 22 in FIG. 3 to provide a hinge-like assembly. Such assembly is then cut into varying lengths, e.g., from 12 inches to 7 feet, depending upon the size of the leather substrates to be finished, and the finishing assemblies thus completed.

Each leather substrate to be laminated is then inserted into the finishing assembly, pre-coating with adhesive being unnecessary in view of the inherent tacky adhesive character of the top coat of the finish coating to be transferred thereto. The assembly is fed through a nip roll device to apply the desired heat and pressure to the superposed strata and effect the desired transfer of the finish coating. Good results are obtained when one roll is heated to about 300°–400° F with a line pressure of about 80–150 lbs. per linear inch, the other pressure roll having a durometer of about 40–60.

The sandwich fed through the roll is thereafter opened, the leather substrate to which the finish coating has transferred is removed, and the remaining backing and release layers are discarded. The coated leather is then fed through the same nip rolls or other pressure rolls (e.g., rolls 31 and 32 are described in Example 1) to complete the cure of the finish coating if necessary, and to iron and impart the desired final gloss to the finish.

EXAMPLES 10–11

Base coats useful in the continuous or batch-wise transfers of the preceding examples may be prepared by deposition and drying of coatings formed from the following further formulations:

| Example 10 | | |
|---|---|---|
| "Primal B-15" | — | 15 parts |
| "Primal AC-34" | — | 10 parts |
| "Dull 140" | — | 1 parts |
| White Pigment (Rohm and Haas' "Primal White 1687") | — | 2 parts |
| Example 11 | | |
| "Primal B-15" | — | 11 parts |
| "Primal E-32" | — | 3 parts |
| "Dull 140" | — | 2 parts |
| Iron oxide pigment (Rohm and Haas' "Primal 406 Brown") | — | 2 parts |

The preceding examples illustrate preferred techniques and compositions which may be employed in accordance with the method of the present invention. It will, of course, be understood that the method may be otherwise carried out, e.g., by effecting the transfer of the finish coating between platens rather than between squeeze rolls, or by the direct transfer of the finish coating to leathers without the use of backing layers. Since these or other changes may be made in the compositions and/or parameters of the methods described hereinabove without departing from the scope of the invention, it is intended that the preceding description should not be construed in a limiting sense.

What is claimed is:

1. A method of finishing leather, which comprises:

a. superimposing the leather substrate to be finished on a release layer having a releasable finish coating thereon, at least the outer stratum of the finish coating on said layer comprising a thermoplastic, adhesive acrylic polymer coating adapted to be bonded to and permanently adhere to the surface of the leather; said finish coating comprising a first stratum for forming a base coat of the finish on the leather, said base coat being constituted of said thermoplastic, adhesive acrylic polymer coating; and a second stratum for forming a top coat of the finish on the leather, said top coat being constituted of a hard non-tacky nitrocellulose lacquer;

b. subjecting the superimposed layers to the application of heat and pressure to transfer the finish coating to the leather; and c. separating the release layer from the thus finished leather.

2. The method of claim 1, wherein said base coat is substantially thicker than said top coat whereby to impart sufficient flexibility to the finish coating on the leather to prevent cracking thereof.

3. The method of claim 1, wherein said thermoplastic, adhesive acrylic polymer coating comprises an interpolymer made up of (A) units having carboxylate groups from at least one polymerizable alpha, beta-unsaturated vinylidene carboxylic acid, (B) units from at least one polymerizable ester which by itself forms soft polymers and which is selected from the group consisting of esters of acrylic acid and primary or secondary alkanols having from 1 to 18 carbon atoms, esters of methacrylic acid and primary or secondary alkanols having from 5 to 18 carbon atoms, and (C) units from at least one polymerizable monovinylidene compound which by itself forms a hard polymer and which is selected from the class consisting of alkyl methacrylates in which the alkyl group has from 1 to 4 carbon atoms, tert-amyl methacrylate, tert-butyl acrylate, tert-amyl acrylate, cyclohexyl acrylate, and cyclohexyl methacrylate, the carboxylated units constituting between 0.5 and 2.5% by weight of the interpolymer and the ratio of units (B) from said ester to units (C) from said compound being between 9:1 and 1:20.

4. The method of claim 1, wherein the leather substrate to be finished is supported by a backing layer contacting said substrate, and wherein the finish coating is transferred in step (b) from the release layer to the juxtaposed surfaces of the leather substrate and the backing layer to thereby offset substantially all of the finish coating from the release layer.

5. The method of claim 4, wherein the backing layer and the release layer are continuous supporting and transfer webs, respectively, and in which the leather substrate is finished by:

a. placing the same on the supporting web and feeding said web with the leather substrate thereon into contact with the transfer web;

b. transferring the finish coating from the transfer web to the juxtaposed surfaces of the leather substrate and the supporting web;

c. separating the transfer web from the supporting web and the finish coated leather substrate; and d. removing the coated leather substrate from the supporting web.

6. The method of claim 5, wherein the supporting web is constituted of kraft paper and the transfer web is a paper coated on at least one side with a permanent release coating having the transferable finish coating pre-coated thereon.

7. The method of claim 6, wherein the transfer web is coated on both sides with said permanent release coating.

8. The method of claim 5, wherein the backing layer and the release layer are discrete sheet material articles having substantially the same dimensions and being secured to one another along an abutting edge of each said article, and in which the backing and release layers are pressed into a sandwich-like assembly with the leather substrate therebetween to transfer the finish coating from the release layer to the juxtaposed surfaces of the leather substrate and the backing layer.

9. The method of claim 8, wherein the backing layer is constituted of kraft paper and the release layer is a paper coated on one side with a permanent release coating having the transferable finish coating pre-coated thereon.

* * * * *